(12) United States Patent
Cook et al.

(10) Patent No.: US 11,861,409 B2
(45) Date of Patent: Jan. 2, 2024

(54) DISTRIBUTED DECOMPOSITION OF STRING-AUTOMATED REASONING USING PREDICATES

(71) Applicant: Amazon Technologies, Inc., Seattle, WA (US)

(72) Inventors: John Byron Cook, Brooklyn, NY (US); Andres Philipp Noetzli, San Jose, CA (US); Neha Rungta, San Jose, CA (US); Jingmei Hu, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 17/218,541

(22) Filed: Mar. 31, 2021

(65) Prior Publication Data
US 2022/0318059 A1    Oct. 6, 2022

(51) Int. Cl.
*G06F 9/46* (2006.01)
*G06F 9/50* (2006.01)
*G06F 9/54* (2006.01)

(52) U.S. Cl.
CPC ............ *G06F 9/505* (2013.01); *G06F 9/5038* (2013.01); *G06F 9/5072* (2013.01); *G06F 9/541* (2013.01)

(58) Field of Classification Search
CPC .............................. G06F 9/5038; G06F 9/505
USPC ........................................................ 718/102
See application file for complete search history.

(56) References Cited

U.S. PATENT DOCUMENTS

| 2008/0281563 A1* | 11/2008 | Ganai | G06F 11/3608 703/2 |
| 2013/0095864 A1* | 4/2013 | Marovets | G06Q 30/0239 455/466 |
| 2021/0191988 A1* | 6/2021 | Galitsky | G06F 40/295 |

OTHER PUBLICATIONS

Al-Haj et al., "Security-Aware Resource Allocation in Clouds", 2013 (Year: 2013).*
Jin et al., "P-Verifier: Understanding and Mitigating Security Risks in Cloud-based IoT Access Policies", 2022 (Year: 2022).*
Backes et al. "Semantic-based Automated Reasoning for AWS Access Policies using SMT", 2018 (Year: 2018).*

(Continued)

*Primary Examiner* — Bradley A Teets
(74) *Attorney, Agent, or Firm* — Nicholson DeVos Webster & Elliott LLP

(57) ABSTRACT

Techniques are described for efficiently distributing across multiple computing resources satisfiability modulo theories (SMT) queries expressed in propositional logic with string variables. As part of the computing-related services provided by a cloud provider network, many cloud providers also offer identity and access management services, which generally help users to control access and permissions to the services and resources (e.g., compute instances, storage resources, etc.) obtained by users via a cloud provider network. By using resource policies, for example, users can granularly control which identities are able to access specific resources associated with the users' accounts and how those identities can use the resources. The ability to efficiently distribute the analysis of SMT queries expressed in propositional logic with string variables among any number of separate computing resources (e.g., among separate processes, compute instances, containers, etc.) enables the efficient analysis of such policies.

19 Claims, 9 Drawing Sheets

(56) References Cited

OTHER PUBLICATIONS

Eiers et al. "Quacky: Quantitative Access Control Permissiveness Analyzer", 2022 (Year: 2022).*
Alam et al., "A Cross Tenant Access Control (CTAC) Model for Cloud Computing: Formal Specification and Verification", 2017 (Year: 2017).*
Okwuibe et al., "SDN-Enabled Resource Orchestration for Industrial IoT in Collaborative Edge-Cloud Networks", 2021 (Year: 2021).*
Anonymous, "Satisfiability modulo theories—Wikipedia", Available Online at <https://en.wikipedia.org/w/index.php?title=Satisfiability_modulo_theories&oldid=1014216986>, Last Edited on Mar. 25, 2021, 10 pages.
Barrett, Clark, "SMT Solvers: Theory and Practice", New York University, Available Online at <https://resources.mpi-inf.mpg.de/departments/rg1/conferences/vtsa08/slides/barret2_smt.pdf>, Sep. 17, 2008, 236 pages.
Hyvarinen et al., "Search-Space Partitioning for Parallelizing SMT Solvers", Lecture Notes in Computer Science 9340, 2015, pp. 369-386.
International Search Report and Written Opinion, PCT App. No. PCT/US22/22646, dated Jul. 6, 2022, 12 pages.
Moskewicz et al., "Chaff: Engineering and Efficient SAT Solver", Proceedings of the 38th Annual Design automation Conference, Jun. 22, 2001, pp. 530-535.

* cited by examiner

DISTRIBUTED DECOMPOSITION OF STRING-AUTOMATED REASONING USING PREDICATES

BACKGROUND

Cloud provider networks enable users to use a variety of computing-related resources such as compute resources, storage resources, networking resources, and the like. When a user or application interacts with a cloud provider network (e.g., using an application programming interface (API) or command line interface (CLI) provided by the cloud provider network), the user or application typically is required to specify security credentials to indicate who the user or application is and whether the user or application has permission to access the requested resources. A cloud provider network in turn uses the security credentials to authenticate and authorize the user or application to perform various actions. Access to resources and actions within a cloud provider network may be further managed by policies. A policy is a data object that, when associated with a user or resource, defines its permissions. For example, resource-based policies can be attached to a storage resource, compute instance, encryption keys, etc., and can specify who has access to the resource and what actions those identities can perform on the resource.

BRIEF DESCRIPTION OF DRAWINGS

Various embodiments in accordance with the present disclosure will be described with reference to the drawings, in which.

DETAILED DESCRIPTION

Figure 1:
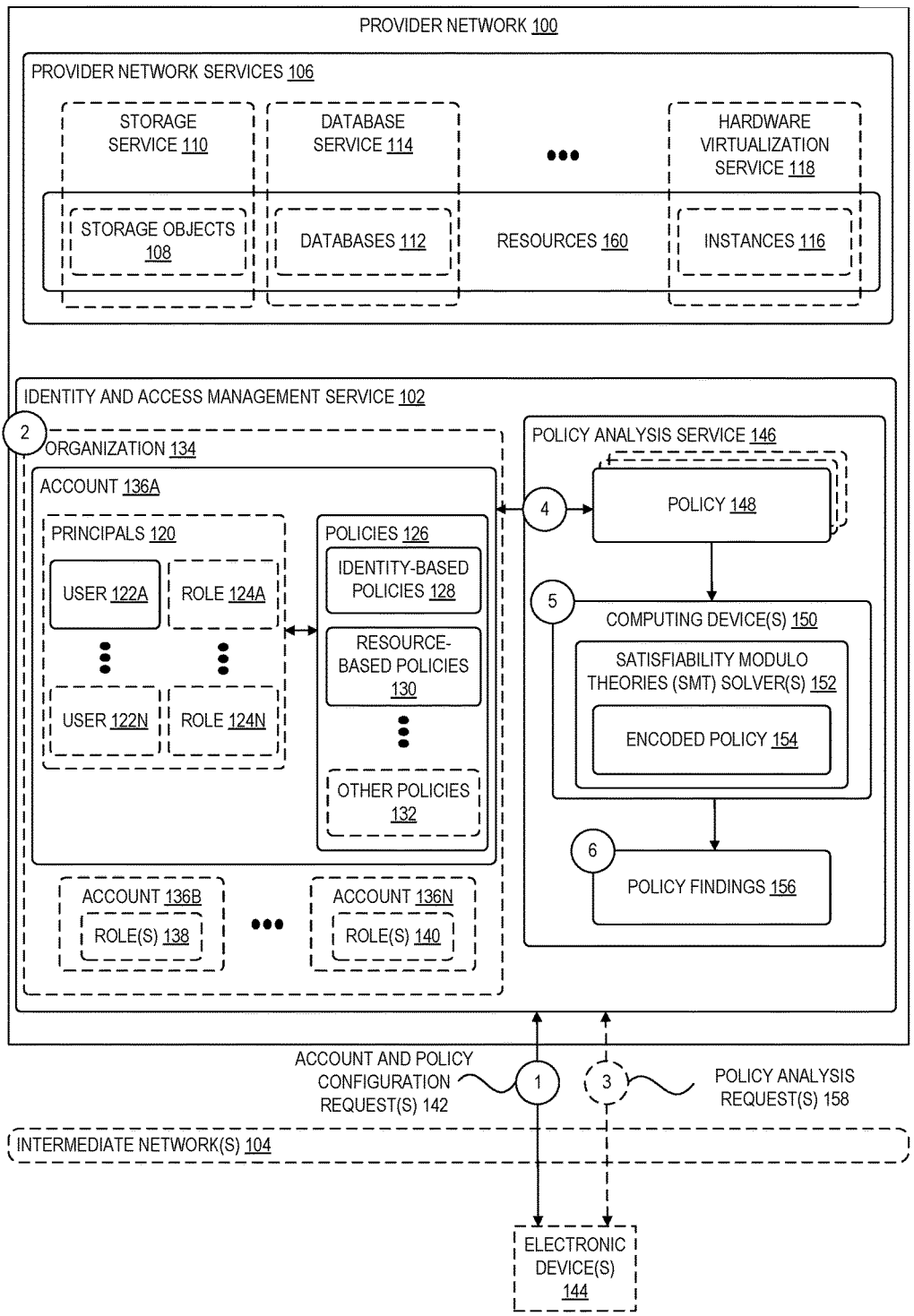
FIG. 1 is a diagram illustrating an environment including a policy analysis service used to analyze policies associated with users accounts and organizations of user accounts of a cloud provider network according to some embodiments.

The present disclosure relates to methods, apparatus, systems, and non-transitory computer-readable storage media for efficiently distributing across multiple computing resources the processing of satisfiability modulo theories (SMT) queries expressed in first-order logic and including theory variables (e.g., variables associated with the theory of strings, the theory of integers, the theories of data structures, etc.). According to some embodiments, as part of the computing-related services provided by a cloud provider network, many cloud providers also offer identity and access management services, which generally help users to control access and permissions to the services and resources (e.g., compute instances, storage resources, etc.) obtained by users via a cloud provider network. By using identity-based and resource-based policies, for example, users can granularly control which identities are able to access specific resources associated with the users' accounts and how those identities can use the resources. The configuration of such policies however can often become quite complex and it can quickly become challenging for users to understand all the security-related implications of such policies and their interrelationships.

To alleviate some of these concerns, a cloud provider network may provide various analysis tools that help users analyze the security-related characteristics of the resources and associated policies within their accounts. One example of such a security tool is an access analyzer, which can be used to help users understand which identities can access particular resources associated with their account and, for example, help users identify whether their current policy configurations potentially provide unintended access to users outside of their organization. In this example, an access analyzer service may perform such analyses in part by translating a users' or organizations' stored policies into equivalent logical statements (e.g., statements expressed in a first order logic) and use a suite of general-purpose and specialized logical solvers (e.g., SMT solvers) to verify whether certain security-related behaviors are possible or not. In this context, the logical solvers may reason about propositional logic statements including various string variables, e.g., corresponding to aspects of policies such as account identifiers, resource identifiers, and the like. In addition to identity and access management services, some cloud provider networks also provide source code review and optimization services, program or computer network verification services, among other types of services that utilize automated reasoning to help analyze the correctness of various types of computing systems.

The SMT solvers described above generally attempt to prove or disprove formulae expressed in first-order logic with combinations of theories such as Presburger arithmetic, uninterpreted functions, or strings. Existing SMT solvers are generally monolithic, single process applications and no successful method exists for efficiently distributing the search for proofs or disproofs of such formulas across multiple computing resources. As the size and complexity of users' and organizations' policies and computing-related resources increases, the resources needed to reason and provide information about these resources in a timely manner using existing solvers can quickly outgrow the resources available on individual computing resources.

These challenges, among others, are addressed by techniques described herein for efficiently distributing the analysis of SMT queries expressed in first-order logic and including theory variables among any number of separate computing resources (e.g., among separate processes, compute instances, containers, etc.). According to embodiments described herein, for example, a service of a cloud provider network receives a request to determine whether a formula is satisfiable (e.g., to verify some expected behavior of a users' or organizations' set of policies or other such automated reasoning-based analysis). The service identifies a set of predicates in the formula based on a type of theory associated with the formula, where each predicate is a binary-valued function of at least one theory variable contained in the formula. In some embodiments, a search space associated with the formula is then partitioned into a set of sub-formulas, where each sub-formula is defined by a union of the formula with an assumption that a respective predicate of the set of predicates is either true or false. In some embodiments, a respective sub-formula of the set of sub-formulas is sent to an SMT solver running on each of a plurality of separate computing resources. Once an indication is received from the SMT solver running any of the computing resources that its respective sub-formula is satisfiable, the policy analysis service can cause display of information indicating that the formula is satisfiable; otherwise, the policy analysis service can cause display of or otherwise transmit information indicating the formula is unsatisfiable. Among other benefits, the described analysis techniques enable efficient computation of SMT queries expressed in first order logic and including theory variables, thereby also helping to improve the security posture of organizations' computing resources provided by cloud provider networks and other operating environments.

FIG. 1 is a diagram illustrating an environment in which security policy analyses are performed relative to users' accounts, organizations (e.g., including sets of users, roles, and policies), and policies defined by an identity and access management service 102 of a cloud provider network 100 according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network 100 (or "cloud" provider network) provides users with the ability to utilize one or more of a variety of types of computing-related resources 160 such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services 106, such as a hardware virtualization service 118 that can execute compute instances, a storage service 110 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network 100 via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The hardware virtualization service 118 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the provider network 100 includes a container service. The container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some embodiments, an identity and access management service 102 is a service that enables users to securely control access to cloud provider network resources (e.g., resources 160 associated with various provider network services 106, such as storage objects 108 associated with a storage service 110, databases 112 associated with a database service 114, compute instances 116 associated with a hardware virtualization service 118, and the like). The identity and access management service 102 is used to control who is permitted to authenticate (e.g., sign in) with the cloud provider network 100 and who is authorized (e.g., has permissions) to use resources provided by the cloud provider network. In general, a resource is a concept used to capture the domain of items that can be created, read, modified, or deleted by customers in a cloud provider network 100. Examples of resources also include principals (e.g., principals 120, including example users 122A-122N and roles 124A-124N) and policies 126 (e.g., including identity-based policies 128, resource-based policies 130, and other policies 132). FIG. 1 further illustrates the concept of an organization 134, which can include any number of associated accounts 136A-136N, which in turn can include any number of users and roles (e.g., role(s) 138 associated with account 136B and role(s) 140 associated with account 136N).

In some embodiments, when a person initially creates an account with the cloud provider network 100, the person begins with a single sign-in identity that has complete access to all cloud provider network services and resources associated with the account (e.g., a root user of principals 120). For example, the root user identity may be accessed by signing in with a username (e.g., an email address) and a password used to create the account. Cloud provider networks 100 often advise users not to use a root user for most tasks and instead to create additional user accounts with defined permissions (e.g., including one or more of user accounts 122A-122N). In some embodiments, a user can grant different permissions to different user accounts for different resources. For example, a user account might be configured to allow some users complete access to a hardware virtualization service 118, a storage service 110, and other cloud provider network 100 resources. For other users, a user account might allow read-only access to some storage buckets, or permission to administer some instances 116, etc.

In some embodiments, an account includes identity-related objects stored as part of the identity and access management service 102 including, for example, users 122A-122N, groups (not illustrated), roles 124A-124N, policies 126, and the like. These resources can be added, edited, and removed by users of the cloud provider network 100 with sufficient privileges, e.g., using a web-based console, API, CLI, or other interface provided by the identity and access management service 102.

In some embodiments, a principal 120 represents a person or application that can make a request for an action or operation on a resource of the cloud provider network 100 (e.g., a resource 160 or a resource of the identity and access management service 102). The set of principals 120 associated with an account 136A can include any number of users 122A-122N and roles 124A-124N. A cloud provider network request occurs when a principal (e.g., a user or a role) sends a request for an action or operation on a resource. A request can include some or all of the following information: the action or operations that the principal wants to perform, the resource object upon which the actions or operations are performed, the person or application that used an entity (e.g., a user or role) to send the request, environment data (e.g., information about the IP address, user agent, SSL enabled status, time of day, etc.), and resource data (e.g., data related to the resource that is being requested, such as a resource identifier, or a tag name). The identity and access management service 102 gathers the information contained in a request into a request context, where the request context is used to evaluate and authorize the request.

In some embodiments, for a request to be completed, the identity and access management service 102 determines whether the requesting principal is authorized (e.g., permitted) to complete the request. During authorization, the identity and access management service 102 uses values included in the request context to check for policies that apply to the request (e.g., one or more of policies 126). The identity and access management service 102 uses the policies 126 to determine whether to allow or deny the request. In some embodiments, the policies 126 are stored in the identity and access management service 102 as JavaScript Object Notation (JSON) documents (or using any other data format) and specify the permission statements applicable to principal entities, resources, or combinations thereof. In some embodiments, there are several types of policies 126 that can affect whether any given request is authorized including, e.g., identity-based policies 128, resource-based policies 130, among other possible types of policies 132. For example, to provide users with permissions to access resources in their own account, identity-based policies can be configured, while resource-based policies may be used for granting cross-account access to resources. In some embodiments, the identity and access management service 102 checks each policy that applies to the context of a request. If a single permissions policy includes a denied action, the identity and access management service 102 may deny the entire request. In some embodiments, an identity and access management service 102 denies requests by default, such that a request is authorized only if every part of a request is allowed by applicable permissions policies.

In some embodiments, once a request is authenticated and authorized, the identity and access management service 102 approves the actions or operations in the request. Operations are defined by a service and include actions that can be performed on or relative to a resource, such as viewing, creating, editing, and deleting that resource. For example, the identity and access management service 102 may support actions such as CreateUser, DeleteUser, CreateRole, and AssumeRole, among many other possible actions. To allow a principal to perform an operation, the action is included in a policy that applies to the principal or the affected resource.

In some embodiments, identity-based policies 128 are permissions policies that are attached to an identity, such as a user, group, or role in an account. In some embodiments, resource-based policies are permissions policies that are attached to a resource such as a storage object 108 or a role trust policy. A resource-based policy controls what actions a specified principal can perform on that resource and under what conditions. In some embodiments, the identity and access management service 102 further supports trust policies, which can be attached to a role (e.g., one or more of roles 124A-124N). Because a role is both an identity and a resource that supports resource-based policies, in some embodiments, both a trust policy and an identity-based policy is attached to a role. Trust policies define which principal entities (accounts, users, roles, and federated users) can assume the role.

In some embodiments, a role is an identity that a user creates in an account that has specific permissions. A role is similar to a user, in that it is an identity with permission policies that determine what the identity can and cannot do. However, instead of being uniquely associated with one person, a role is intended to be assumable by anyone who needs it. Also, a role may not have standard long-term credentials such as a password or access keys associated with it. Instead, when an entity assumes a role, it is provided with temporary security credentials for a role session. Roles can be used to delegate access to users, applications, or services that do not normally have access to the resource. For example, a person might want to grant users in an account access to resources those users do not usually have access to or grant users in one account access to resources in another account.

As indicated above, users may often desire to obtain assurance that their configured policies are configured in a way that helps protect their data and resources. In some embodiments, a policy analysis service 146 uses various types of automated reasoning to perform such analyses and to present policy findings to users based on the analyses. At a high level, automated reasoning is a method of formal verification that automatically generates and checks mathematical proofs which help to prove the correctness of systems (e.g., to analyze policies and the future consequences of policies). As indicated above, policies dictate who can (or cannot) perform particular actions relative to particular resources, and a policy analysis service 146 can use automated reasoning to check properties of the policies. Although some of the examples herein relate to the analysis of policies managed by an identity and access management service 102, similar automated reasoning techniques can be used to analyze the correctness of source code, analyze network configurations, or generally perform any type of analysis related to various types of computing resources or computing systems.

In some embodiments, to perform such analyses, a policy analysis service 146 translates policies into equivalent logical statements and runs a suite of general-purpose and specialized logical solvers (e.g., SMT solvers) against the problem. In general, an SMT solver uses a mix of numbers, strings, regular expressions, dates, and IP addresses, etc., to prove and disprove logical formulas. A policy analysis service 146 may not examine, for example, access logs to determine whether an external entity accessed a resource within your zone of trust. Rather, it can generate a finding when a resource-based policy allows access to a resource, even if the resource has not yet been accessed by any external entity. Furthermore, to perform such analyses, the service may not consider the state of any external accounts when making its determination.

In FIG. 1, the numbered circles labeled "1"-"6" illustrate a process of one or more users configuring accounts, principals, policies, etc., via an identity and access management service 102 and a policy analysis service 146 performing an analysis of one or more of the users' policies, as described above. In particular, the illustrated process involves distributing the processing of one or more SMT queries expressed in propositional logic with string variables across multiple computing resources (e.g., across computing device(s) 150), as described in more detail herein after.

In some embodiments, at circle "1" in FIG. 1, one or more users associated with an organization 134 use electronic device(s) 144 to generate account and policy configuration request(s) 142 to configure a set of accounts 136A-136N, principals 120 associated with an organization (e.g., an organization represented by organization 134), etc., and to further configure policies 126 associated with some or all of those principals and resources 160 associated with an organization. These principals, for example, may be created to provide authentication for users and processes within accounts (e.g., account 136A-136N) of the cloud provider network 100. As indicated above, identities represent a user and can be authenticated and then authorized to perform actions in the cloud provider network 100 and each identity can be associated with one or more policies 126 to determine what actions a user or role can do with which cloud provider network resources and under what conditions. The collection of accounts, principals, and policies may be created, for example, by an organization that intends to use various services 106 of the cloud provider network 100 for various purposes. Furthermore, the collection of accounts, principals, and policies comprising an organization may be modified over time as desired by the organization.

In some embodiments, at circle "2," responsive to the account and policy configuration request(s) 142, the identity and access management service 102 creates and stores data representing the accounts, principals, and policies. As further indicated above, these principals and policies can be added, edited, and removed by external users of the cloud provider network 100 with sufficient privileges, e.g., using a web-based console, API, CLI, or other interface provided by the identity and access management service 102, and data representing the principals and policies can be stored using various types of storage resources managed by the identity and access management service 102.

Once a user or organization has created one or more policies, the users may desire to analyze the policies to obtain assurance that the configured policies are configured in a way that helps protects their data and resources (e.g., to help ensure that resources are not accessible to undesirable entities, to help ensure that users are not inadvertently permitted to perform undesirable actions, etc.). In some embodiments, at circle "3," a user optionally requests 158 to perform one or more analyses on their policies, e.g., using a web-based console or other interface. In other embodiments, a policy analysis service 146 automatically performs one or more analyses, e.g., in response to requests to view more general information about various types of resources 160 associated with one or more user accounts.

At circle "4," the policy analysis service 146 obtains one or more policies 148 relevant to the requested analysis. For example, if the requested analysis involves determining whether any external entity is permitted to access one or more resources associated with a user account, the policy analysis service 146 may obtain one or more resource-based policies associated with the appliable resources 160. In other examples, identity-based policies or other policies 132 may be obtained depending on the type of analysis to be performed.

At circle "5," the policy analysis service 146 generates an encoded version of the one or more policies 148 and uses one or more SMT solvers 152 to check one or more properties of the policies. In some embodiments, the encoded policy 154 is generated by translating the permission statements contained in one or more policies 126 (e.g., expressed in a JSON-based format or other syntax) into constraints expressed using first-order logic (e.g., expressed using the SMT-LIB format or other formal syntax). At a high level, the encoded policy includes a set of set of constraints that, when analyzed by a SMT solver 152, generates an output indicating that the associated formula (e.g., the formulation of the properties to be checked) is satisfiable if there is an assignment of values to the variables of the constraints for which the formula satisfied; otherwise, if no such assignment of values to the variables exists, then the formula is unsatisfiable.

Figure 2:
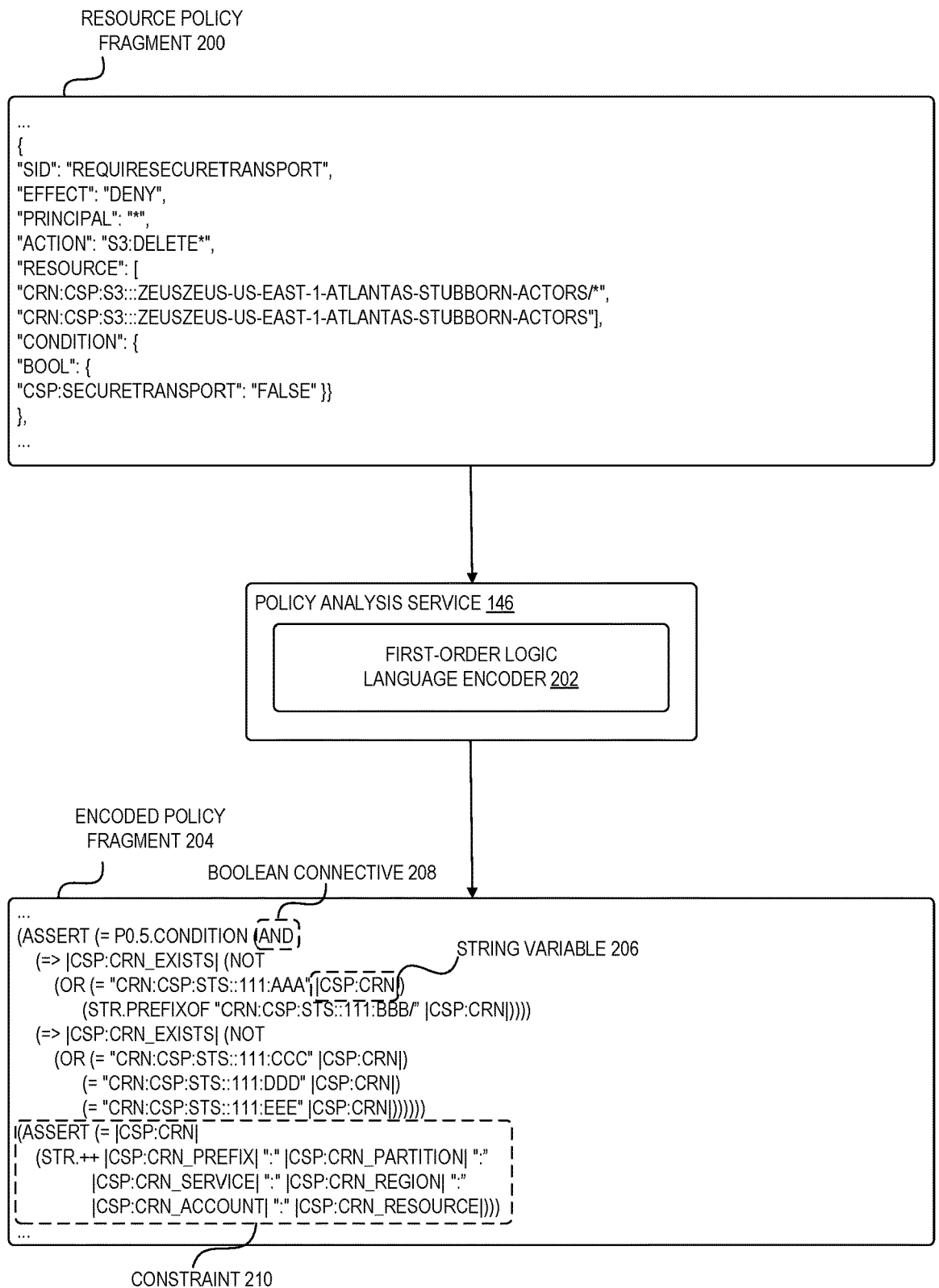
FIG. 2 is a diagram illustrating a process for encoding permissions defined by a policy into propositional logic statements including string variables according to some embodiments.

FIG. 2 is a diagram illustrating a process for encoding permissions defined by a policy into propositional logic statements including string variables according to some embodiments. In FIG. 2, a resource policy (e.g., including a resource policy fragment 200) is provided as input to a first-order language encoder 202 to generate an encoded policy (e.g., including an example encoded policy fragment 204). In some embodiments, the first-order language encoder 202 implements the Satisfiability-Modulo-Theory Library and Standard (SMT-LIB) or any other syntax for formally specifying formula related to policies of a cloud provider network 100. As shown, the encoded policy includes a number of variables (e.g., including a string variable 206), Boolean connectives (e.g., the Boolean connective 208 corresponding to the logical AND connective), which together can form various constraints (e.g., including a constraint 210). In some embodiments, a collection of one or more constraints define a formula that can be passed to a solver, where the solver checks the satisfiability of the formula by determining whether a satisfying assignment for the variables exists. Although in this example, the formula includes string variables, in other examples, other types of theory variables can be included in the encoded representation depending on a type of information to be analyzed. For example, in other embodiments, an encoded representation of information to be analyzed can include variables associated with a theory of integers, a theory of real arithmetic, a theory of bit vectors, a theory of arrays, a theory of list structures, etc.

In some embodiments, to distribute the processing of SMT queries expressed in first-order logic, as described above, the policy analysis service 146 partitions the formula defined by an encoded policy into a plurality of sub-formulas. Each of the sub-formulas can be processed by a SMT solver running on an independent computing resource (e.g., as a separate process, an independently executable thread, VM instance, container, on-demand executable function, etc.). In this manner, the plurality of sub-formulas divides the total search space for a satisfying assignment for the formula among the set of sub-formulas, the processing of which can be parallelized as described above, thereby significantly reducing the time needed to solve the formula in most cases. Some of the examples provided herein illustrate the partitioning of a formula according to string variables identified in the formula; in general, the described techniques can be used to partition formulas in a theory-based manner, e.g., depending on a type or types of theory variables contained in the SMT query.

Figure 3:
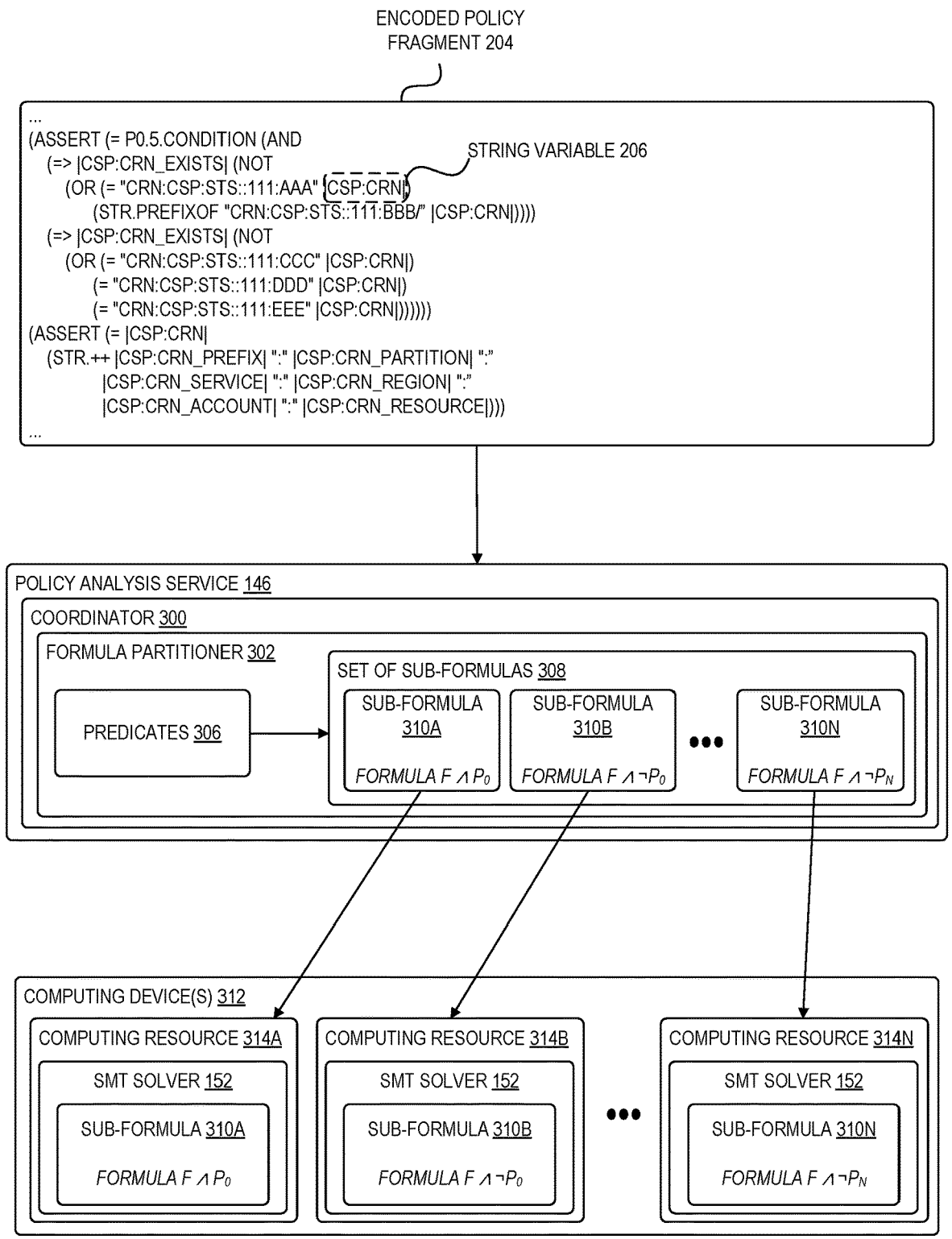
FIG. 3 is a diagram illustrating a process for partitioning a search space associated with a formula expressed in propositional logic and including string variables into a set of sub-formulas, the execution of which can be distributed across multiple computing resources, according to some embodiments.

FIG. 3 is a diagram illustrating a process for partitioning a search space associated with a formula expressed in first-order logic and including string variables into a set of sub-formulas, the execution of which can be distributed across multiple computing resources 314A-314N, according to some embodiments. In FIG. 3, a coordinator 300 process of a policy analysis service 146 takes as input one or more encoded policies (e.g., illustrated by encoded policy fragments 204) and causes a formula partitioner 302 to identify a set of predicates 306 used to partition the formula represented by the encoded policies into a set of sub-formulas 308 (e.g., including sub-formula 310A-310N). One illustrative algorithm for partitioning a formula in a set of sub-formulas 308 is as follows:

```
def pulp (f: Formula) → Set(Formula):
    pulped = Ø
    for p ∈ predicates(f):
        pulped = pulped ∪ {f ^ p} ∪ {f ^ ¬p}
    return pulped
```

In the example above, the pulp routine takes as input a formula f (e.g., defined by the encoded policy) and returns a set of sub-formula, represented by the set pulped. The predicates (f) routine generates predicates over strings in formula f which mention the most mentioned string variable. For example, in the encoded policy fragment 204, the string variable csp:crn is the most mentioned string variable (e.g., it is mentioned more time than the csp:crn_prefix and csp:crn_region string variables). In this example, the predicates (f) routine splits the formula containing the string variable into a set of predicates that contain an instance of the most mentioned string variable csp:crn (e.g., "(="arn:aws:sts::111:AAA"|aws:arn|)", "(str.prefixof "arn:aws:sts::111:BBB/"|aws:arn|)", "(="arn:aws:sts::111:CCC"|aws:arn|)", "(="arn:aws:sts::111:DDD"|aws:arn|)", etc.). In some embodiments, each predicate is thus a binary-valued function of at least one string variable contained in the formula. In other embodiments, other predicate generating techniques can be used, for example, by splitting the formula into predicates containing the top N most frequently occurring string variables, into predicates of approximately equal computational complexity, etc. For example, in some embodiments, predicates can be categorized based on an estimated computational complexity of reasoning about the theory variable or variables contained in each predicate. A formula may then be partitioned by grouping predicates in to a plurality of predicate groups based on their estimated computational complexity (e.g., where multiple lower complexity predicates may be grouped in a single partition while higher complexity predicates may be separately partitioned, etc.)

The routine further iterates through the obtained list of predicates (f) and, for each predicate, adds a sub-formula to the pulped set, where the sub-formula includes the formula with an assumption that the predicate either True or False. In this manner, each sub-formula restricts the search space associated with the original formula to a partition of the search space where one of the predicates in predicates(f) either True or False. Each of these sub-formulas represents an independent instance that can be analyzed by a SMT solver 152, which can be distributed amongst a set of independent computing resources (e.g., separate threads of a multi-threaded execution environment, separate compute instances, containers, on-demand executable functions provided by various services of a cloud provider network, etc.) each executing a SMT solver. In some embodiments, if any of the SMT solvers returns an indication that its sub-formula is satisfiable, then it can be determined that the formula is satisfiable. Otherwise, if all SMT solvers return an indication that the respective sub-formulas are unsatisfiable, then it can be determined that the formula is unsatisfiable.

Figure 4:
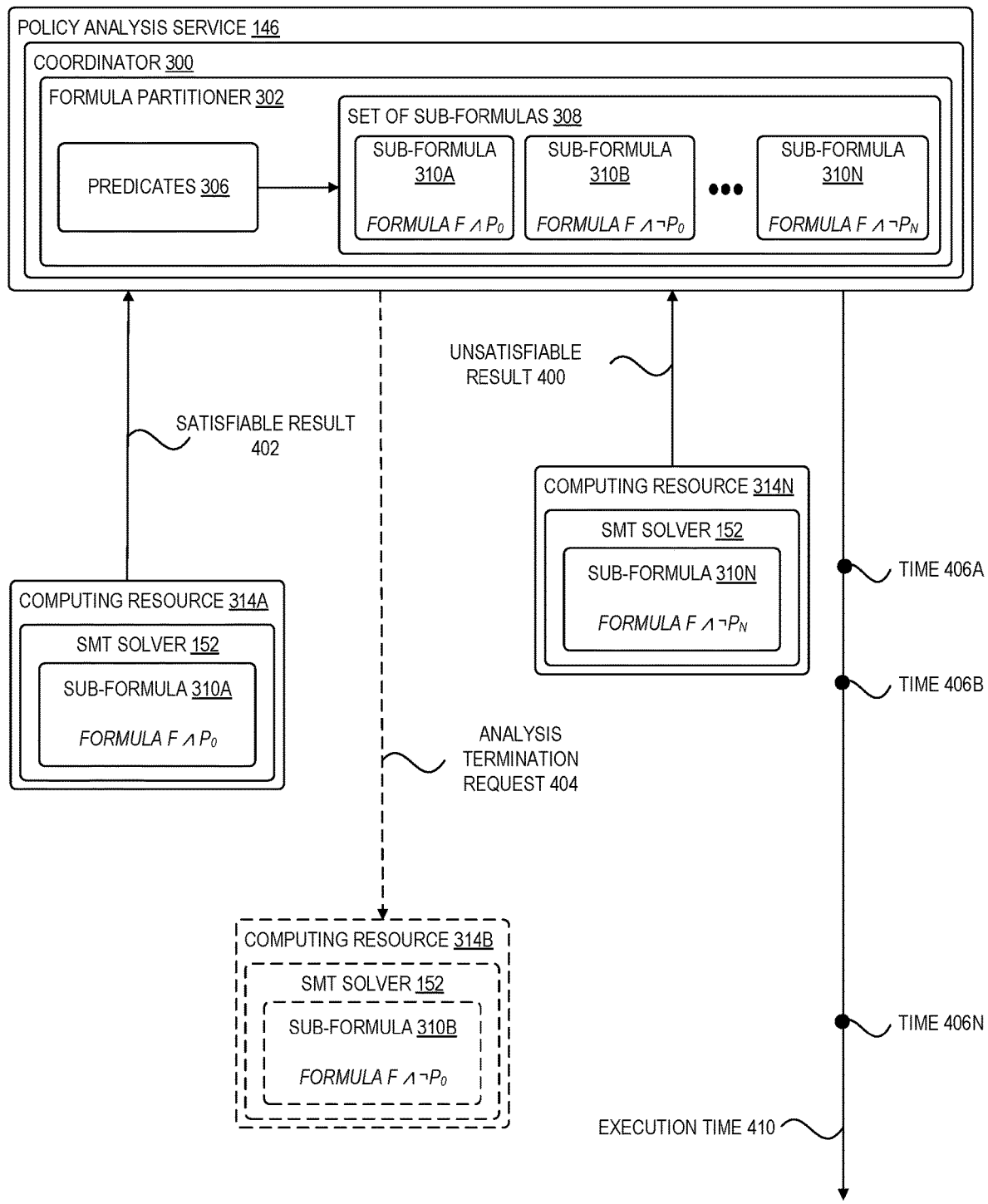
FIG. 4 is a diagram illustrating the use of a satisfiability solver executing across multiple computing resources to analyze a set of sub-formulas derived from a formula expressed in propositional logic and including string variables according to some embodiments.

FIG. 4 is a diagram illustrating the use of a SMT solver executing across multiple computing resources to analyze a set of sub-formulas derived from a formula expressed in first-order logic and including string variables according to some embodiments. As shown, each of a plurality of computing resources 314A-314N executes a SMT solver 152 and is assigned by the coordinator 300 a respective sub-formula of a set of sub-formula 308 (e.g., computing resource 314A is assigned sub-formula 310A, computing resource 314B is assigned sub-formula 310B, and computing resource 314N is assigned sub-formula 310N). In general, the sub-formulas of the set of sub-formulas 308 can be distributed across the multiple computing resources in any manner, for example, depending on a number of sub-formulas and a number of available computing resources.

In some embodiments, an example algorithm executed by a coordinator 300 process to determine the satisfiability of a formula f using a set of computing resources is illustrated below:

```
def worker (s: Solver, g: Formula) → ( ):
    match s(g) with
    | SAT => sat = true,
    | UNSAT => completed = completed ∪ {g}
def distribute_solver (f: Formula, s: Solver) → {SAT,UNSAT} :
    pulped = pulp(f)
    sat = false
    completed = ∅
    totalCubes = |pulped|
    for p ∈ pulped:
        run worker(s, p)
    while |completed| < totalCubes:
        if sat == true:
            return SAT
    return UNSAT
```

In the example above, a worker routine is defined that takes as input a Solver s and a Formula g and returns an indication that the formula f is either satisfiable (e.g., if a satisfying assignment of values to the variables of the sub-formula exists) or unsatisfiable (e.g., if it is determined that no satisfying assignment of values to the variables of the sub-formula exists). In some embodiments, each of the computing resources 314A-314N includes a process that implements a routine similar to the worker routine illustrated above using a SMT solver 152.

In some embodiments, the distribute_solver routine takes as input a formula f and solver s and returns an indication of whether the formula is satisfiable or unsatisfiable. In particular, the distribute_solver routine generates the pulped set of sub-formula, described above with respect to FIG. 3, and distributes the sub-formulas to a plurality of separate workers (e.g., a plurality of separate computing resources 314A, which can include separate processes, threads, compute instances, containers, on-demand executable functions, etc.). In some embodiments, once any of the workers returns an indication that a respective sub-formula is satisfiable, the distribute_solver routine returns an indication that the formula is satisfiable. Otherwise, if none of the workers returns an indication that the formula is satisfiable (e.g., all workers return an indication that their respective sub-formula is unsatisfiable), the routine returns an indication that the formula is unsatisfiable. In some embodiments, if an indication is received from respective workers that a sub-formula is unsatisfiable under both the assumption its predicate is true and the assumption its predicate is false, then the routine can return an indication that the formula is unsatisfiable (e.g., even before all workers return an indication that their respective sub-formula are unsatisfiable).

In FIG. 4, for example, the computing resource 314A-314N each process a respective sub-formula from sub-formulas 310A-310N. At time 406A along the total execution time 410 of the workers, the computing resource 314N returns an indication that its sub-formula 310N is unsatisfiable as unsatisfiable result 400. At time 406B, the computing resource 314A returns a satisfiable result 402 indicating that its sub-formula 310A is satisfiable. As indicated above, because the sub-formula 310A is satisfiable, the coordinator 300 process can determine that the overall formula f is satisfiable. In some embodiments, the coordinator 300 process optionally can terminate the processing of other sub-formula by other worker computing resources (e.g., as illustrated by the analysis termination request 404 sent to computing resource 314B). Thus, whereas solving the formula as a whole might take at least until time 406N to determine whether the formula is satisfiable, the distributed processing of the formula only takes until time 406B when one of the sub-formula is determined to be satisfiable.

Returning to FIG. 1, in some embodiments, based on the analysis performed by the SMT solvers 152, at circle "5," the policy analysis service 146 generates policy findings 156. The policy findings 156 can generally include any information that is obtained based on the reasoning performed relative to the one or more policies 148. For example, the policy findings can include an indication that one or more resources 160 are accessible to one or more entities outside of a defined zone of trust, that a policy permits one or more unintended operations to be performed relative to one or more resources 160, that a user can assume a role that the user is not intended to be able to assume, and the like. In some embodiments, more generally, based on the analysis performed by the SMT solvers 152, the coordinator 300 can transmit a message indicating whether the formula is satisfiable or unsatisfiable. The transmitted message can result in the display of information associated with the result, can be sent to one or more downstream SMT solvers or other automated reasoning tools for further analysis, or used by any other processes.

Figure 5:
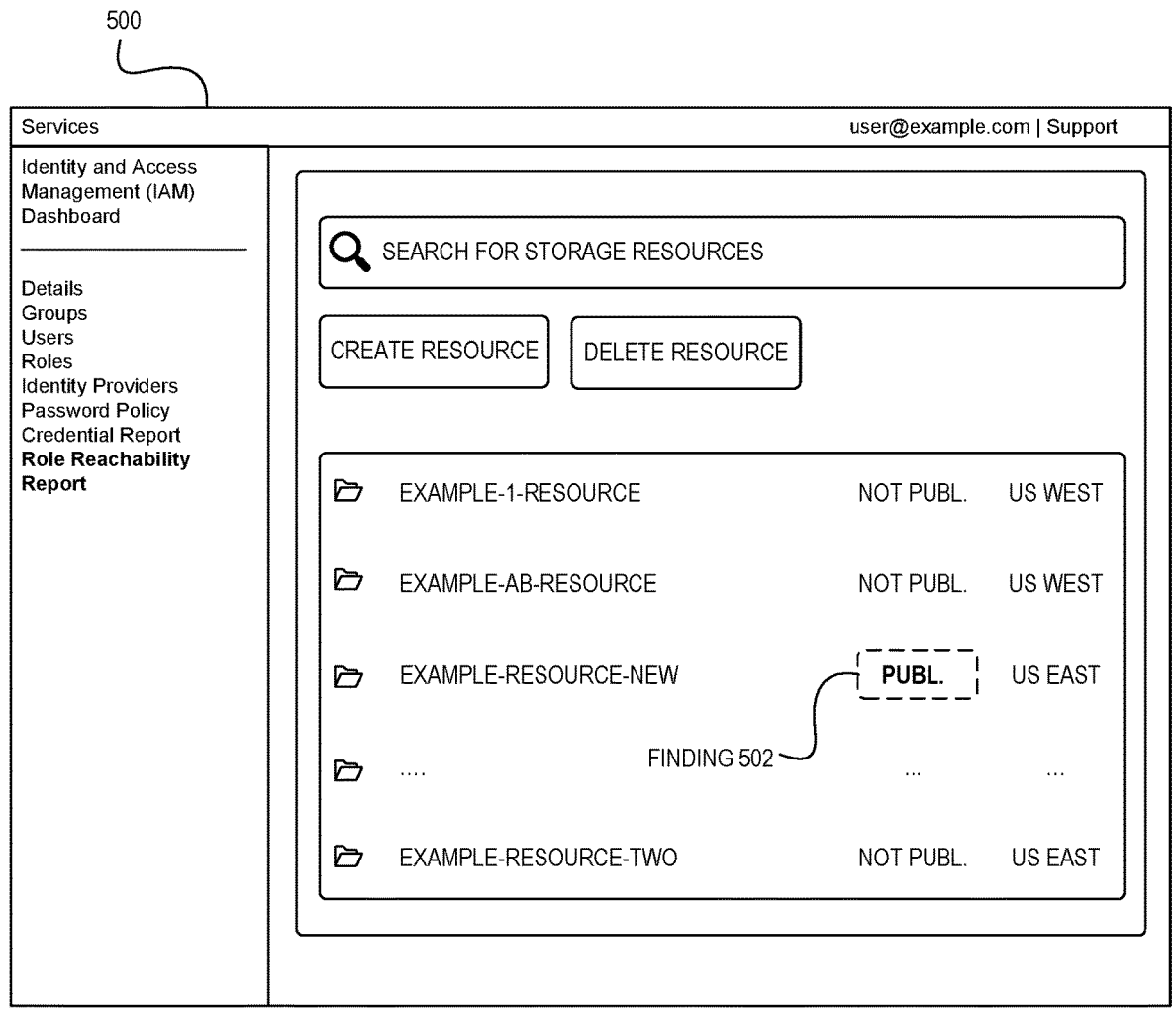
FIG. 5 is a diagram illustrating a graphical user interface (GUI) displaying policy findings derived from an analysis of one or more policies according to some embodiments.

FIG. 5 is a diagram illustrating a graphical user interface (GUI) displaying policy findings derived from an analysis of one or more policies according to some embodiments. The GUI 500, for example, illustrates a console interface displaying a list of storage resources (e.g., "example-1-resource", "example-ab-resource", etc.). In some embodiments, the interface further includes at least one policy finding 502 indicating information about a resource that derived from an automated reasoning-based analysis as described above. In this example, the finding 502 indicates that one of the storage resources is accessible to users outside of a defined zone of trust, which may prompt a user to further analyze and modify policies associated with the resource to mitigate the unintended access to the resource. In general, the presentation of such policy findings can be presented in other types of interfaces (e.g., CLIs, standalone application interfaces, etc.) and relate to other types of policy analyses, as described herein.

Figure 6:
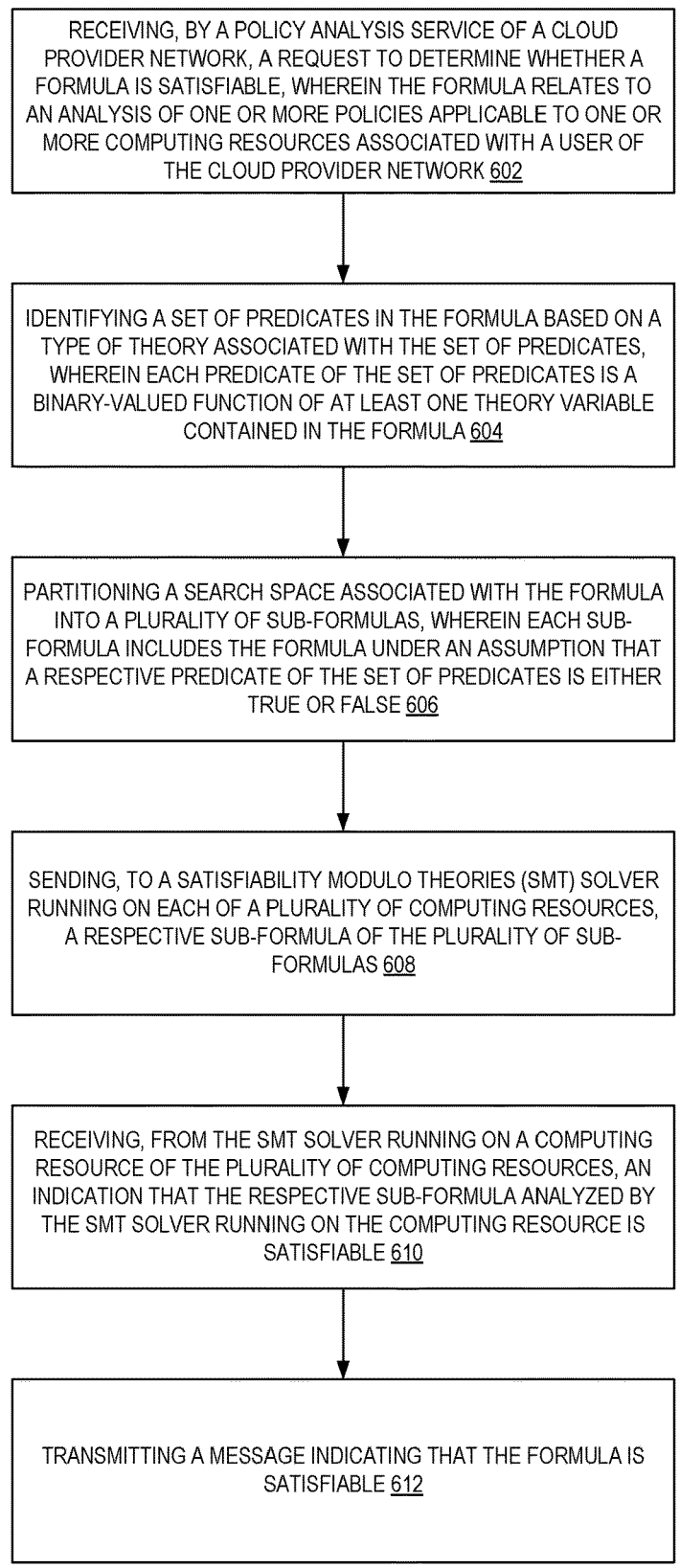
FIG. 6 is a flow diagram illustrating operations of a method for using reasoning techniques to analyze formulas expressed in a propositional logic and including string variables according to some embodiments.

FIG. 6 is a flow diagram illustrating operations 600 of a method for using reasoning techniques to analyze formulas expressed in a propositional logic and including string variables according to some embodiments according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a policy analysis service 146 of the other figures.

The operations 600 include, at block 602, receiving, by a policy analysis service of a cloud provider network, a request to determine whether a formula is satisfiable, wherein the formula relates to an analysis of policies attached to one or more computing resources associated with a user of the cloud provider network.

The operations 600 further include, at block 604, identifying a set of predicates in the formula based on a type of theory associated with the set of predicates, wherein each predicate of the set of predicates is a binary-valued function of at least one theory variable contained in the formula. For example, the type of theory may be at least one of: a theory of strings, a theory of integers, a theory of real arithmetic, a theory of bit vectors, a theory of arrays, a theory of list structures, etc. In some embodiments, the type of theory is a theory of strings and the theory variable is a string variable, and the operations further include identifying a most frequently occurring theory variable in the formula, and where each predicate of the set of predicates includes an instance of the most frequently occurring theory variable.

The operations 600 further include, at block 606, partitioning a search space associated with the formula into a plurality of sub-formulas, wherein each sub-formula includes the formula with an assumption that a respective predicate of the set of predicates is either true or false.

The operations 600 further include, at block 608, sending, to a SMT solver running on each of a plurality of computing resources, a respective sub-formula of the plurality of sub-formulas. In some embodiments, each computing resource of the plurality of computing resources is an independently executable thread of a plurality of threads, and where the plurality of threads executes on one more computing devices. In some embodiments, each computing resource of the plurality of computing resources is one of: a compute instance provided by a hardware virtualization service of a cloud provider network, a container provided by a container service of the cloud provider network, or an on-demand executable function provided by an on-demand executable code service of the cloud provider network.

The operations 600 further include, at block 610, receiving, from the SMT solver running on a computing resource of the plurality of computing resources, an indication that the respective sub-formula analyzed by the SMT solver running on the computing resource is satisfiable.

The operations 600 further include, at block 612, transmitting a message indicating that the formula is satisfiable. For example, the message may be used to cause display of information indicating that the formula is satisfiable, can be sent to one or more downstream SMT solvers or other automated reasoning tools for further analysis, or used by any other processes.

In some embodiments, the formula relates to at least one of: an analysis of policies applicable to one or more computing resources associated with a user of a cloud provider network, an analysis of correctness of a computer program, or an analysis of correctness of a computer network configuration. In some embodiments, satisfiability of the formula determines whether a computing resource associated with an account or organization defined by a cloud provider network is accessible to an entity external to the account or organization, and wherein the information indicating that the formula is satisfiable indicates that the computing resource is accessible to an entity external to the account or organization. In some embodiments, the request identifies a policy managed by an identity and access management service of a cloud provider network, and wherein the method further comprises generating the formula by encoding the policy into a first-order logic format.

In some embodiments, the computing resource of the plurality of computing resource is a first computing resource and the indication is a first indication, and wherein the first indication that the formula is satisfiable is received from the SMT solver running on the first computing resource before a second indication is received from a second computing resource of the plurality of computing resources.

In some embodiments, the operations further include receiving a second request to determine whether a second formula expressed in first-order logic is satisfiable; generating a second set of predicates based on the second formula; partitioning a search space associated with the second formula into a second plurality of sub-formulas; sending, to the SMT solver running on each of the respective plurality of second computing resources, a respective sub-formula of the second plurality of sub-formulas; receiving, from each SMT solver running on a computing resource of the plurality of computing resources, an indication that the respective sub-formula is not satisfiable; and transmitting a message indicating that the second formula is unsatisfiable.

In some embodiments, the operations further include receiving a second request to determine whether a second formula expressed in first-order logic is satisfiable; generating a second set of predicates based on the second formula; partitioning a search space associated with the second formula into a second plurality of sub-formulas; sending, to the SMT solver running on each of the respective plurality of second computing resources, a respective sub-formula of the second plurality of sub-formulas; receiving a first indication that a particular sub-formula of the second plurality of sub-formulas is unsatisfiable under an assumption that its respective predicate is true and a second indication that the particular sub-formula of the second plurality of sub-formulas is unsatisfiable under an assumption that its respective predicate is false; and transmitting a message indicating that the second formula is unsatisfiable.

In some embodiments, the operations further include grouping the set of predicates into a plurality of predicate groups based on an estimated computational complexity associated with each predicate of the set of predicates, wherein the search space is partitioned based on the plurality of predicate groups.

In some embodiments, the operations further include causing display of a graphical user interface (GUI) including the information indicating that the formula is satisfiable, wherein the information indicates a value for the at least one string variable that causes the formula to be satisfiable. In some embodiments, the message indicating that the formula is satisfiable is used as input to another SMT solver.

Figure 7:
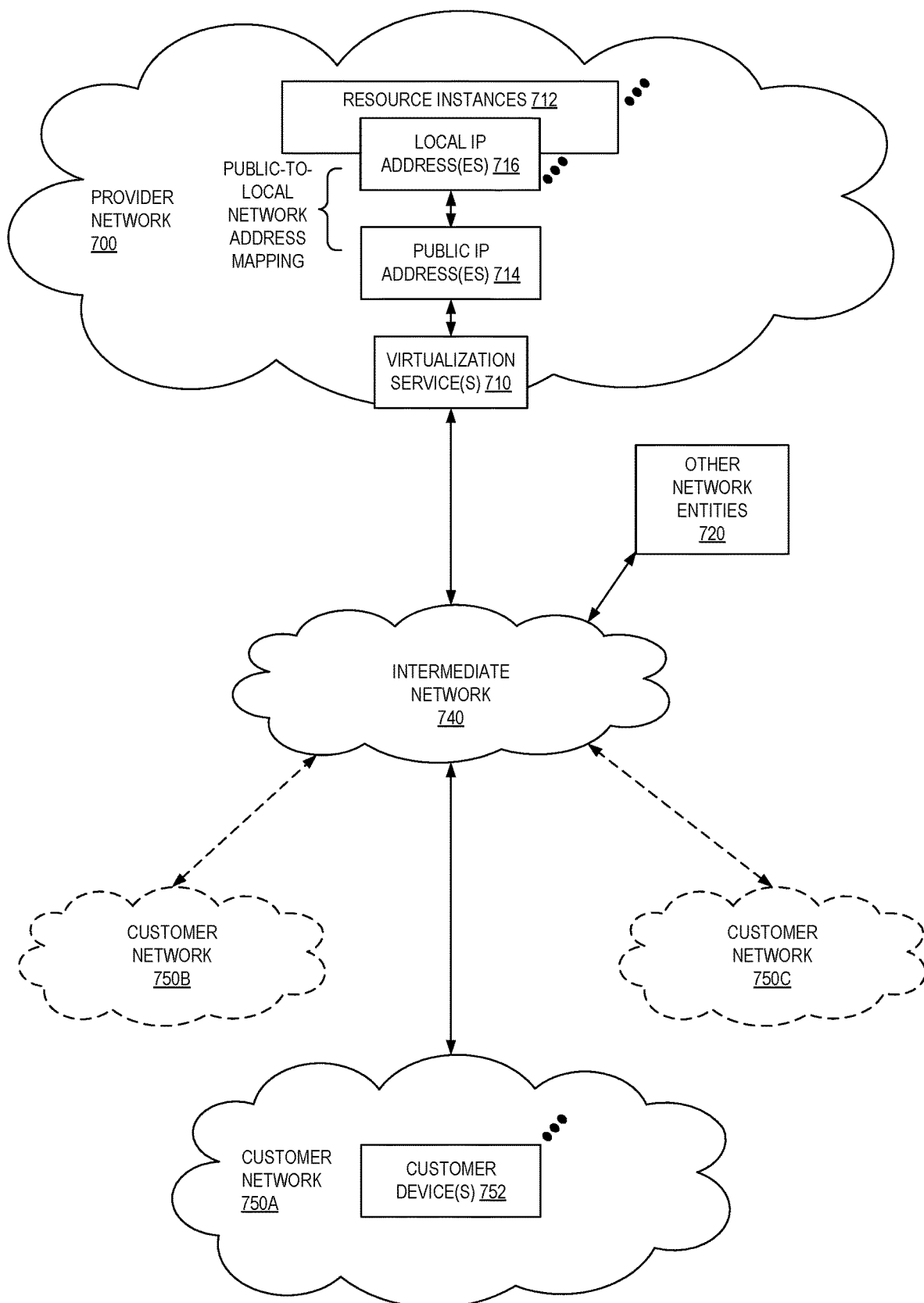
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
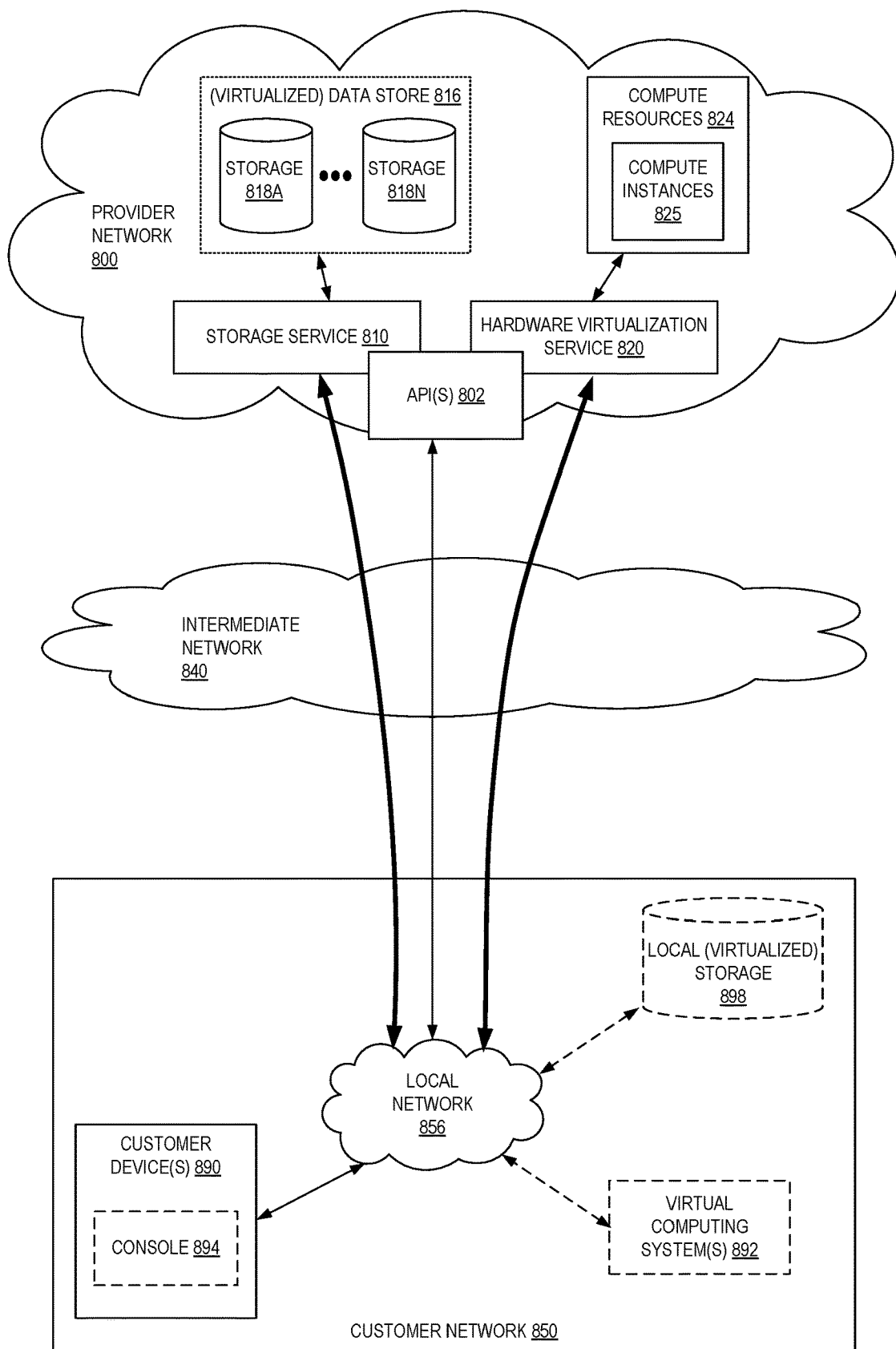
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
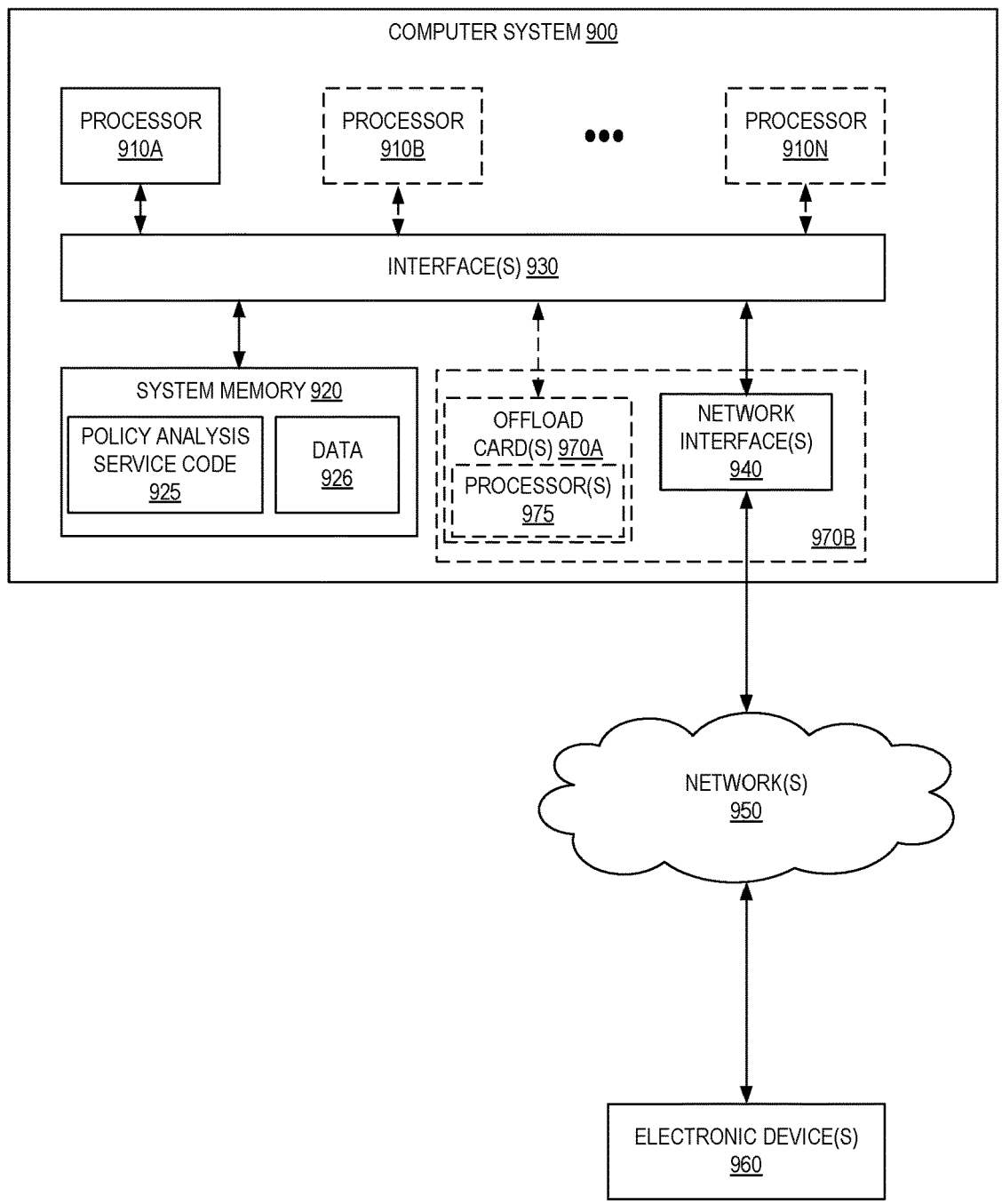
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as policy analysis service code 925 (e.g., executable to implement, in whole or in part, the policy analysis service 146) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a policy analysis service of a cloud provider network, a request to determine whether a formula is satisfiable, wherein the formula relates to an analysis of one or more policies applicable to one or more computing resources associated with a user of the cloud provider network;
   identifying a set of predicates in the formula based on string variables included in the formula, wherein each predicate of the set of predicates is a binary-valued function of at least one string variable contained in the formula;
   partitioning a search space associated with the formula into a plurality of sub-formulas, wherein each sub-formula of the plurality of sub-formulas includes the formula under an assumption that a respective predicate of the set of predicates is either true or false;
   sending, to a satisfiability modulo theories (SMT) solver running on each of a plurality of computing resources, a respective sub-formula of the plurality of sub-formulas;
   receiving, from the SMT solver running on a computing resource of the plurality of computing resources, an indication that the respective sub-formula analyzed by the SMT solver running on the computing resource is satisfiable;
   causing display of information indicating that the formula is satisfiable, wherein satisfiability of the formula determines a property of the one or more policies defining permissions applicable to the one or more computing resources associated with the user of the cloud provider network; and
   controlling access to the one or more computing resources according to the one or more policies defining permissions applicable to the one or more computing resources associated with the user of the cloud provider network.

2. The computer-implemented method of claim 1, further comprising identifying a most frequently occurring string variable in the formula, and wherein each predicate of the set of predicates includes an instance of the string variable.

3. The computer-implemented method of claim 1, wherein each computing resource of the plurality of computing resources is one of: an independently executable thread, a compute instance, a container, or an on-demand executable function.

4. A computer-implemented method comprising:
   receiving, by a coordinator process running on a first computing resource, a request to determine whether a formula expressed in propositional logic is satisfiable;
   identifying a set of predicates in the formula based on a type of theory associated with the set of predicates, wherein each predicate of the set of predicates is a binary-valued function of at least one theory variable contained in the formula;
   partitioning a search space associated with the formula into a plurality of sub-formulas, wherein each sub-formula of the plurality of sub-formulas includes the formula under an assumption that a respective predicate of the set of predicates is either true or false;
   sending, to a satisfiability modulo theories (SMT) solver running on each of a respective plurality of computing resources, a respective sub-formula of the plurality of sub-formulas;
   receiving, from the SMT solver running on a computing resource of the plurality of computing resources, an indication that the formula is satisfiable;
   transmitting a message indicating that the formula is satisfiable, wherein satisfiability of the formula determines a property of a policy defining permissions applicable to a computing resource associated with a cloud provider network; and
   controlling access to the computing resource according to the policy defining permissions applicable to the computing resource associated with the cloud provider network.

5. The computer-implemented method of claim 4, wherein the type of theory is a theory of strings and the theory variable is a string variable, and wherein the method further comprises identifying a most frequently occurring theory variable in the formula, and wherein each predicate of the set of predicates includes an instance of the most frequently occurring theory variable.

6. The computer-implemented method of claim 4, wherein each computing resource of the plurality of computing resources is an independently executable thread of a plurality of threads, and wherein the plurality of threads executes on one or more computing devices.

7. The computer-implemented method of claim 4, wherein the type of theory is at least one of: a theory of strings, a theory of integers, a theory of real arithmetic, a theory of bit vectors, a theory of arrays, or a theory of list structures.

8. The computer-implemented method of claim 4, wherein each computing resource of the plurality of computing resources is one of: a compute instance provided by a hardware virtualization service of the cloud provider network, a container provided by a container service of the cloud provider network, or an on-demand executable function provided by an on-demand executable code service of the cloud provider network.

9. The computer-implemented method of claim 4, wherein satisfiability of the formula determines whether the computing resource associated with an account or organization defined by the cloud provider network is accessible to an entity external to the account or organization, and wherein the message indicating that the formula is satisfiable indicates that the computing resource is accessible to an entity external to the account or organization.

10. The computer-implemented method of claim 4, wherein the request identifies the policy managed by an identity and access management service of the cloud provider network, and wherein the method further comprises generating the formula by encoding the policy into a first-order logic format.

11. The computer-implemented method of claim 4, wherein the computing resource of the plurality of computing resource is a first computing resource and the indication is a first indication, and wherein the first indication that the formula is satisfiable is received from the SMT solver running on the first computing resource before a second indication is received from a second computing resource of the plurality of computing resources.

12. The computer-implemented method of claim 4, further comprising:
receiving a second request to determine whether a second formula expressed in first-order logic is satisfiable;
generating a second set of predicates based on the second formula;
partitioning a search space associated with the second formula into a second plurality of sub-formulas;
sending, to the SMT solver running on each of the respective plurality of computing resources, a respective sub-formula of the second plurality of sub-formulas;
receiving, from each SMT solver running on a computing resource of the plurality of computing resources, an indication that the respective sub-formula is not satisfiable; and
transmitting a message indicating that the second formula is unsatisfiable.

13. The computer-implemented method of claim 4, further comprising:
receiving a second request to determine whether a second formula expressed in first-order logic is satisfiable;
generating a second set of predicates based on the second formula;
partitioning a search space associated with the second formula into a second plurality of sub-formulas;
sending, to the SMT solver running on each of the respective plurality of computing resources, a respective sub-formula of the second plurality of sub-formulas;
receiving a first indication that a particular sub-formula of the second plurality of sub-formulas is unsatisfiable under an assumption that its respective predicate is true and a second indication that the particular sub-formula of the second plurality of sub-formulas is unsatisfiable under an assumption that its respective predicate is false; and
transmitting a message indicating that the second formula is unsatisfiable.

14. The computer-implemented method of claim 4, further comprising:
grouping the set of predicates into a plurality of predicate groups based on an estimated computational complexity associated with each predicate of the set of predicates, wherein the search space is partitioned based on the plurality of predicate groups.

15. The computer-implemented method of claim 4, further comprising causing display of a graphical user interface (GUI) including information indicating that the formula is satisfiable, wherein the information indicates a value for the at least one theory variable that causes the formula to be satisfiable.

16. The computer-implemented method of claim 4, wherein the message indicating that the formula is satisfiable is used as input to another SMT solver.

17. A system comprising:
a first one or more electronic devices to implement a policy analysis service component in a multi-tenant provider network, wherein the policy analysis service component includes instructions that upon execution cause the policy analysis service component to:
receive a request to determine whether a formula is satisfiable, wherein the formula relates to an analysis of one or more policies applicable to one or more computing resources associated with a user of the multi-tenant provider network,
identify a set of predicates in the formula based on a type of theory associated with the formula, wherein each predicate of the set of predicates is a binary-valued function of at least one string variable contained in the formula,
partition a search space associated with the formula into a plurality of sub-formulas, wherein each sub-formula of the plurality of sub-formula includes the formula under an assumption that a respective predicate of the set of predicates is either true or false,
send, to a satisfiability modulo theories (SMT) solver running on each of a plurality of computing resources, a respective sub-formula of the plurality of sub-formulas,
receive, from the SMT solver running on a computing resource of the plurality of computing resources, an indication that the respective sub-formula analyzed by the SMT solver running on the computing resource is satisfiable, and
transmit a message indicating that the formula is satisfiable, wherein satisfiability of the formula determines a property of a policy defining permissions applicable to a computing resource associated with a cloud provider network;
a second one or more electronic devices to implement the SMT solver in the multi-tenant provider network, the SMT solver including instructions that upon execution cause the SMT solver to:
receive the respective sub-formula of the plurality of sub-formulas,
determine whether the sub-formula is satisfiable, and
send the indication that the respective sub-formula is satisfiable; and
a third one or more electronic devices to implement an identify and access management (IAM) service component in the multi-tenant provider network, the IAM service component including instructions that upon execution cause the IAM service component to:
control access to the computing resource according to the policy defining permissions applicable to the computing resource associated with the cloud provider network.

18. The system of claim 17, wherein the policy analysis service component further includes instructions that upon execution cause the policy analysis service component to identify a most frequently occurring a string variable in the formula, and wherein each predicate of the set of predicates includes a single instance of the string variable.

19. The system of claim 17, wherein each computing resource of the plurality of computing resources is one of: a compute instance provided by a hardware virtualization service of the cloud provider network, a container provided by a container service of the cloud provider network, or an on-demand executable function provided by an on-demand executable function service of the cloud provider network.

* * * * *